United States Defensive Publication [19] (H) [11] T101,402

Pateman [43] Jan. 5, 1982

[54] PROCESS OF PASTE EXTRUSION

[76] Inventor: Jeffrey R. Pateman, 74 Attimore Rd., Welwyn Garden City, Hertfordshire, England

[21] Appl. No.: 201,974

[22] Filed: Oct. 29, 1980

[30] Foreign Application Priority Data

Nov. 19, 1979 [GB] United Kingdom ..... 7939952/79

[51] Int. Cl.[3] ..... D04N 1/64

[52] U.S. Cl. ..... 264/127

[57] ABSTRACT

Pipes with walls thicker than 4 mm are made by paste extrusion of PTFE powder in the presence of a lubricant. The extrusion is carried out at a reduction ratio below 20:1. The PTFE powder is a mixture of 80 to 99% by weight of coagulated dispersion grade PTFE and 20 to 1% by weight of PTFE having a median particle size less than 50 micrometers. The mixture is preferably a co-coagulation of the two forms of PTFE.

1 Claim, No Sheets Drawing,

8 Pages Specification

The file of this unexamined application may be inspected and copies thereof may be purchased (849 O.G. 1221, Apr. 9, 1968).